March 19, 1935.    M. ITO    1,995,001

FLASH BUTT WELDING APPARATUS

Filed May 17, 1933

INVENTOR:
MASAJI ITO
BY: Francis C. Boyce
ATTORNEY

Patented Mar. 19, 1935

1,995,001

UNITED STATES PATENT OFFICE 1,995,001

FLASH BUTT WELDING APPARATUS

Masaji Ito, Sumaura-Dori, Suma-Ku, Kobe, Japan, assignor to Kabushiki Kaisha Kawasaki Zosensho (Kawasaki Dockyard Co. Ltd.) Higashi Kawasaki Machi, Minatohigashi-Ku, Kobe, Japan, a corporation of Japan Application May 17, 1933, Serial No. 671,497
In Japan October 4, 1932

4 Claims. (Cl. 219—4)

The present invention relates to apparatus for flash butt welding, particularly to an automatic metallic electrode holder having a means for rotating a metallic electrode about its axis during the operation of flash butt welding.

The primary object of this invention is to provide an electrode holder which drives out gas, slag, other foreign materials, etc. produced during the flash butt process to prevent the formation of blow holes in the welded part of a metal plate by the automatic rotation of the electrode about its axis.

The other object is to obtain such construction of the electrode holder as comprises an automatic operating means for lifting a rotatable device connected to a holder for the electrode, an elastic means for pressing said electrode against a metallic plate, a handle and other accessories.

These and other objects of this invention may be clearly understood from the detailed explanation of the accompanying drawing which shows an embodiment of this invention. However, let it be understood that the present invention is not limited to it, but various modifications may be made within the scope of the claims.

Figure 1:
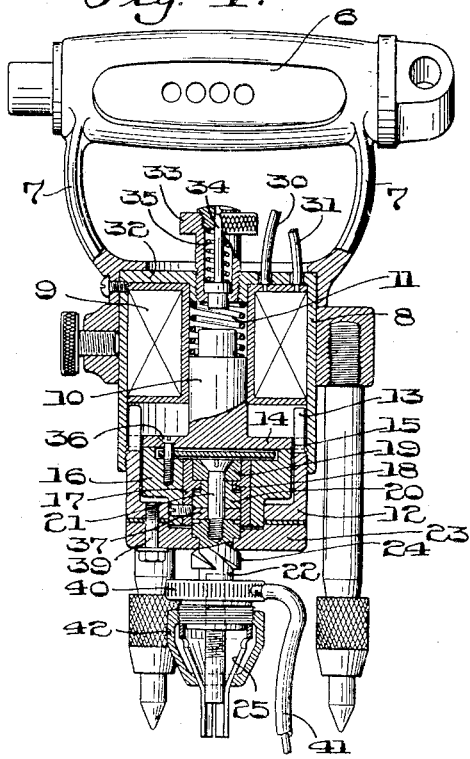
Figure 2:
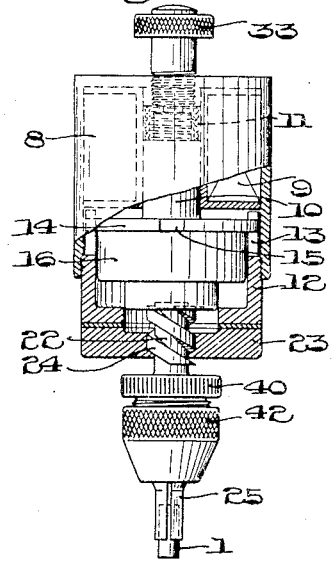
Figure 3:
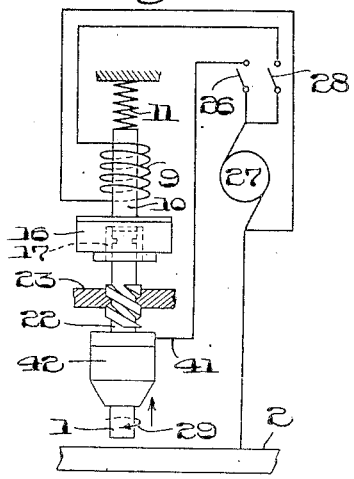

Fig. 1 shows a sectional front elevation of an automatic electrode holder for use in flash butt welding according to this invention;

Fig. 2, a sectional view of the essential part of the electrode holder;

Fig. 3, a diagram of an electric connection for performing flash butt welding with this electric holder and Figs. 4 to 8 are several skeleton diagrams showing different steps of the flash butt operation.

Hitherto as no attempt has been made to prevent the formation of blow holes in the welded part of a metal plate when a metallic rod is welded to it, their cohesive force is so weak that the welded rod is apt to be broken at its root by even the slightest mechanical shock in spite of its strong appearance.

The present invention removes such drawback. For convenience's sake, let me first explain the reason why the welded rod is brittle in the prior art.

Figure 4:
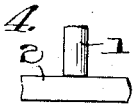
Figure 7:
Figure 5:
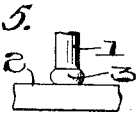
Figure 6:
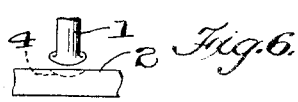

Referring to Figs. 4 to 8, to weld a metallic rod 1 to a metal sheet 2 electrically, they are first brought into contact with each other as shown in Fig. 4 and electric current is passed to them to heat their contact surfaces. Then, the rod 1 is separated from the sheet 2 as shown in Fig. 5 to generate an electric-arc 3 and thereby to liquefy the part 4 of the plate to be welded as shown in Fig. 6. Further, when the rod 1 is pressed against the plate 2, the liquefied part 4 of the plate swells around the rod 1 and this swollen part 4' is cooled rapidly due to the extinction of the electric arc as well as the cool outside air. The metallic rod 1 such as a steel rod contains carbon, hydrogen, etc., so that when heated rapidly at a high temperature by the arc, these gases combine with oxygen in air and are converted into carbon mono-oxide, carbon dioxide or other gases and expand suddenly on account of being heated at a high temperature. Consequently, although the rod 1 appears to have been welded strongly as shown in Fig. 7, the occluded gas stays in the interior of the welded part and forms a blow hole as indicated by a dotted line 5. This is indeed the reason why the welded rod in spite of strong appearance is often broken at its root.

Figure 8:
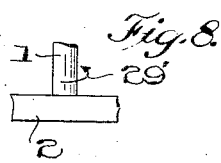

In the present invention, to remove the above drawback, when the rod 1 is pressed against the plate 2, it is rotated as if screwed into the plate as shown in Fig. 8 so as to destroy the shell of the blow hole 5 and thus to enable the occluded gas to escape outside and at the same time to smoothen the soft surfaces of the rod and plate by mechanically rubbing them against each other, so that even the occluded gas in the blow hole on the plate surface is driven out to entirely remove the blow hole from the welded part. Thus, a strong and satisfactory weld can be effected.

Fig. 1 shows an example of the embodiments of this invention. In a casing 8 attached to the arm 7 of a handle 6 is enclosed an electro-magnetic coil 9 the armature 10 of which is adapted to be pressed down by a spiral spring 11 in the normal condition, said armature being lifted by the energization of the coil 9 supplied with electric current through lead wires 30 and 31 from a suitable electric source. Into the upper part 32 of the casing 8 is screwed a cap 33 which is adapted to adjust the elastic force of the spring 11 and which comprises an abutting rod 34 surrounded by a small spiral spring 35, said rod serving to absorb the inertia of the mechanical shock of the lifting armature 10. Integrally with the frame 12 secured to the case 8 at its lower end by means of screw threads, a suitable pair of guide members 13 extends along the inside surface of the case 8 and engages with the grooves 15 cut at the base 14 of the armature 10.

To the lower surface of the base plate 14 of the armature 10 there is secured by means of screws 36 a member 16 which supports a tubular member 17 having an annular rim 18 on its inner surface. Three members 19, 20 and 37 are tightly secured as one block to a rod 22 by means of a screw 21, and the combination of these members is mounted rotatably upon the annular rim 18 in such a manner that the rod 22 rotates freely. The rod has cut thereon a screw thread 24 adapted to engage with the teeth of a guide plate 23 which is fixed to the lower end of the frame 12 by means of screws 39. The rod 22 with the screw thread 24 is provided at its top end with a knurled disk 40 connected through a lead wire 41 to a suitable electric source. With the disk 40 at its lower threaded part is engaged a cap 42 adapted to hold tightly an electrode in a grasping means 25 by turning said cap.

The following is the brief explanation of the operation of this invention with reference to the schematic diagram of the electrical connection as shown in Fig. 3:—

As the spring 11 presses the armature 10 towards the metal plate 2 to push the electrode 1 against it in the normal condition, the current is passed through the electrode and plate from the suitable electric source 27 when a switch 26 is closed. Next, close a switch 28 to excite the coil 9 and the armature 10 will be raised straightly without rotating by the engagement of the guide member 13 with the grooves 15 of the armature base plate 14 as shown in Fig. 1, while the rod 22 will go up, rotating in the direction indicated by an arrow 29, by the engagement of the teeth of the guide plate 23 with the thread of the rod 22 and will separate the electrode 1 from the plate as shown in Fig. 3 and Fig. 5, to generate the electric arc 3 and melt the electrode and the part to be welded. On this occasion, if the switch 28 is open, the coil 9 will be deenergized and the spring 11 will press the armature 10 against the plate 2 while the electrode is turning in the direction indicated by an arrow 29' as shown in Fig. 8, thus bringing it into contact with the surface of the plate and driving out the occluded gas from the melted part so that the contact surface of the plate is made smooth and the rod may be welded to the plate tightly.

By reason of the twisting or rotary movement given the electrode it is found that gas and other inclusions are entirely expelled and that the weld is greatly strengthened by the absence of such inclusions.

I claim:—

1. In a flash welding device, a frame, an electrode holder guided in said frame for simultaneous reciprocation and rotation, said frame being adapted to be supported on the metal to which an electrode in the holder is to be welded, and means to move said electrode holder toward and from the support for the frame.

2. In a flush welding device, a frame, a nut fixed in the frame, an electrode holder having a threaded stem engaged in said nut, and means to reciprocate the electrode holder and its threaded stem whereby rotation of the stem is effected during the reciprocation.

3. In a flash welding device, a casing having longitudinal guide members therein, a reciprocable member mounted in said casing and guided for rectilinear movement by said guide members, a frame fixed to the lower end of the casing, a nut fixed on said frame, a threaded rod engaged in said nut and having swivel connection with said reciprocable member at its inner end, an electrode holder fixed to the outer end of said rod whereby the rod forms a stem for said holder, and means to effect reciprocation of said reciprocable member.

4. In a flash welding device, a casing having longitudinal guide members therein, a reciprocable member mounted in said casing and guided for rectilinear movement by said guide members, a frame fixed to the lower end of the casing, a nut fixed on said frame, a threaded rod engaged in said nut and having swivel connection with said reciprocable member at its inner end, an electrode holder fixed to the outer end of said rod whereby the rod forms a stem for said holder, spring means urging said reciprocable member in a direction to protract said rod and electrode holder, and electro-magnetic means for retracting the rod and holder against the action of the spring means.

MASAJI ITO.